(12) United States Patent
Moriyama et al.

(10) Patent No.: US 12,504,188 B2
(45) Date of Patent: Dec. 23, 2025

(54) RECORDING DEVICE

(71) Applicant: SEIKO EPSON CORPORATION, Tokyo (JP)

(72) Inventors: Ryuji Moriyama, Matsumoto (JP); Yoshihiko Momose, Shiojiri (JP); Yoichi Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 18/433,110

(22) Filed: Feb. 5, 2024

(65) Prior Publication Data

US 2024/0263814 A1 Aug. 8, 2024

(30) Foreign Application Priority Data

Feb. 7, 2023 (JP) ................. 2023-016793

(51) Int. Cl.
*F24F 8/95* (2021.01)
*B41J 11/00* (2006.01)
*B41J 25/00* (2006.01)
*F24F 8/20* (2021.01)

(52) U.S. Cl.
CPC ........... *F24F 8/95* (2021.01); *B41J 11/00214* (2021.01); *B41J 11/007* (2013.01); *B41J 25/001* (2013.01); *F24F 8/20* (2021.01)

(58) Field of Classification Search
CPC .......... F24F 8/95; F24F 8/20; B41J 11/00214; B41J 11/007; B41J 25/001; B41J 2/01; B41J 3/407; B01D 53/02
See application file for complete search history.

(56) References Cited

FOREIGN PATENT DOCUMENTS

JP 2018140530 A * 9/2018

* cited by examiner

*Primary Examiner* — Emmanuel E Duke
(74) *Attorney, Agent, or Firm* — WORKMAN NYDEGGER

(57) ABSTRACT

Provided is a recording device including: a medium support portion that supports a medium, a head that ejects a liquid toward the medium, an irradiation unit that emits an ultraviolet ray toward the medium, a carriage on which the head and the irradiation unit are mounted, a moving mechanism that relatively moves the medium supported by the medium support portion and the carriage in a first direction along a first axis and in a second direction along a second axis intersecting the first axis, a first deodorization portion and a second deodorization portion, which perform deodorization, and a housing that accommodates the medium support portion, the carriage, the first deodorization portion, and the second deodorization portion, in which the first deodorization portion and the second deodorization portion are disposed such that at least a part of the medium support portion overlaps a position between the first deodorization portion and the second deodorization portion in a plan view.

9 Claims, 9 Drawing Sheets

RECORDING DEVICE

The present application is based on, and claims priority from JP Application Serial Number 2023-016793, filed Feb. 7, 2023, the disclosure of which is hereby incorporated by reference herein in its entirety.

BACKGROUND

1. Technical Field

The present disclosure relates to a recording device.

2. Related Art

In the related art, in a recording device that records a character and an image, there has been known a recording device having a function of removing an odor caused by a recording material. For example, JP-A-2018-140530 discloses a printing device including a printing unit, a housing that accommodates the printing unit, and a gas cleaning unit that cleans gas. The gas cleaning unit is located outside the housing and communicates with the inside of the housing via a discharge unit and a supply unit. The printing device decomposes or removes the odor by circulating the gas inside the housing so as to pass through the gas cleaning unit.

In the configuration of the related art described above, the movement of a carriage causes the odor of the material to diffuse inside the housing, and thus the odor may not be completely removed. Therefore, a technique for reducing or removing the odor of the material more efficiently has been desired.

SUMMARY

According to an aspect of the present disclosure, there is provided a recording device including, a medium support portion that supports a medium, a head that ejects a liquid toward the medium, an irradiation unit that emits an ultraviolet ray toward the medium, a carriage on which the head and the irradiation unit are mounted, a moving mechanism that relatively moves the medium supported by the medium support portion and the carriage in a first direction along a first axis and in a second direction along a second axis intersecting the first axis, a first deodorization portion and a second deodorization portion configured to perform deodorization, and a housing that accommodates the medium support portion, the carriage, the first deodorization portion, and the second deodorization portion, in which the first deodorization portion and the second deodorization portion are disposed such that at least a part of the medium support portion overlaps a position between the first deodorization portion and the second deodorization portion in plan view.

DESCRIPTION OF EMBODIMENTS

1. Configuration of Recording Device

Figure 1:
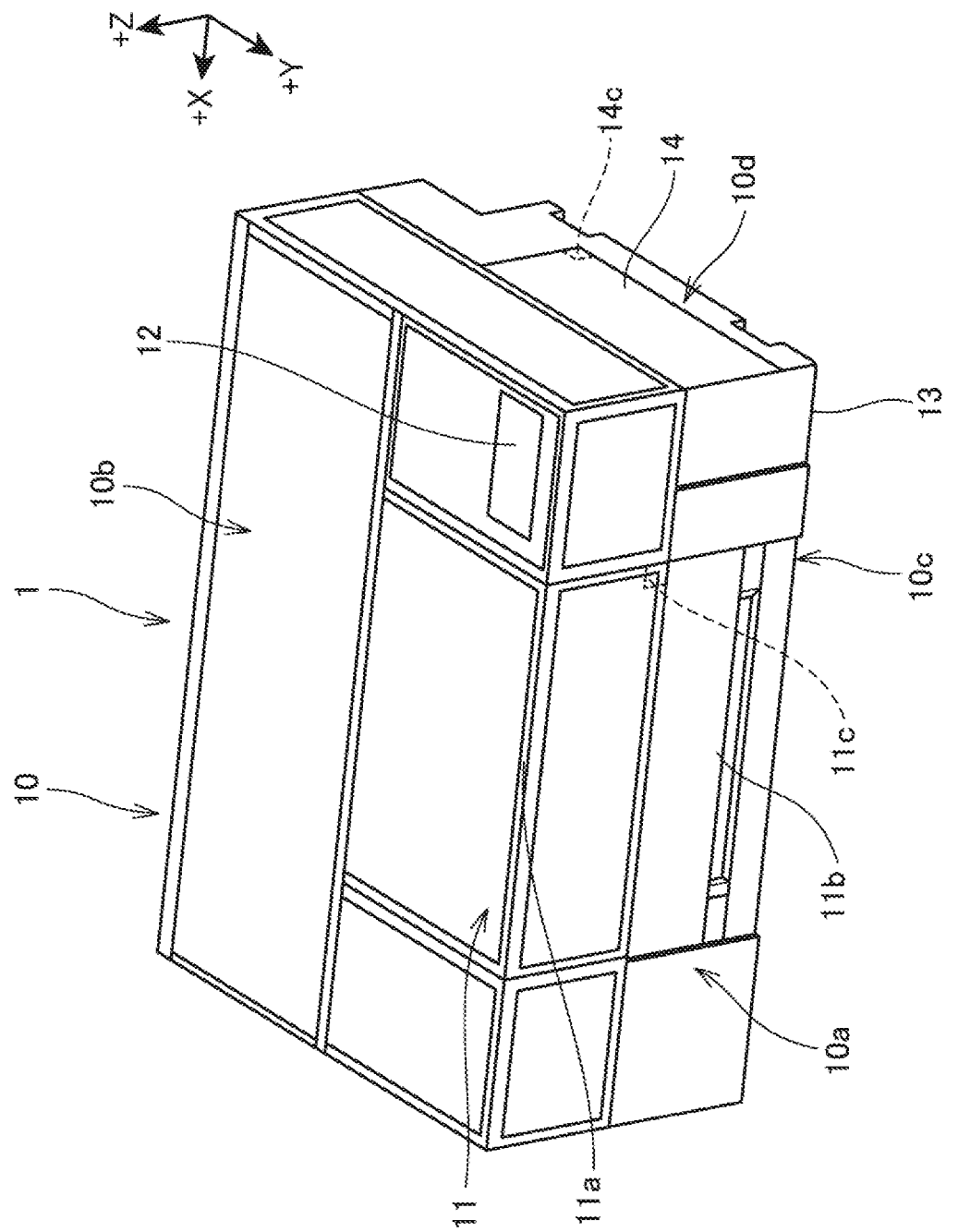
FIG. 1 is a perspective view of a recording device according to an embodiment.

FIG. 1 is a perspective view of a recording device 1 according to an embodiment. The recording device 1 is a device that performs recording on a medium M supported by a medium support portion 30, by ejecting a liquid from a recording head 89*a*. The medium M is a sheet, a cloth, or a three-dimensional object. The sheet may be a sheet made of paper or synthetic resin. The cloth may be any of a non-woven cloth, a knitted material, and a fabric. The three-dimensional object includes ornaments such as clothes or shoes, daily necessities, mechanical components, and other various objects. The type of liquid ejected onto the medium M by the recording device 1 is not limited, as long as the liquid has fluidity. For example, the recording device 1 is a printer that forms an image on the medium M by discharging ink of one or a plurality of colors toward the surface of the medium M by using the recording head 89*a*. In this case, the medium M can be referred to as a printing medium.

In FIG. 1, an X-axis, a Y-axis, and a Z-axis are illustrated. The X-axis, the Y-axis, and the Z-axis are orthogonal to one another. The Z-axis is an axis extending in an up-down direction, and can also be referred to as an axis extending in a vertical direction. The X-axis and the Y-axis are parallel to a horizontal plane. In the following description, a direction along the X-axis is referred to as a left-right direction, and a direction along the Y-axis is referred to as a front-rear direction. Specifically, a forward direction along the Z-axis is an upward direction, a forward direction along the X-axis is a rightward direction, and a forward direction along the Y-axis is a front direction. The forward direction corresponds to an example of a first direction. The X-axis corresponds to an example of a first axis. The Y-axis corresponds to an example of a second axis. The Z-axis is an axis corresponding to an example of a third axis and extending in the vertical direction in the installation state of the recording device 1.

The recording device 1 includes a housing 10. The housing 10 is a substantially cuboid box, and forms a closed space therein. The housing 10 covers the medium support portion 30, the recording head 89*a*, an irradiation unit 89*b*, a first deodorization portion 20, and a second deodorization portion 50, and the like, which will be described later, and accommodates these components in the closed space. The housing 10 includes a front surface cover 11 along a front surface 10*a* and an upper surface 10*b*. The front surface cover 11 includes a cover body 11*a* along the front surface 10*a* and the upper surface 10*b*, and a handle 11*b* coupled to the lower end of the cover body 11*a*. At the rear end of the cover body 11*a*, the front surface cover 11 is coupled to the upper surface 10*b* of the housing 10 by a hinge (not illustrated) so as to be rotatable about an axis in the left-right direction. Thus, the front surface cover 11 can be opened and closed from the front side by moving the handle 11*b* in the up-down direction. Furthermore, a bottom surface 10*c* of the housing 10 includes a bottom plate 13 which is a plate facing the installation surface of the housing 10. The installation surface is a surface on which the housing 10 is installed, such as a top surface of a desk (not illustrated).

The recording device 1 includes a touch panel 12 disposed at a front portion of the upper surface 10b. For example, the touch panel 12 is constituted by a liquid crystal panel and an LED. The touch panel 12 is connected to a control unit 101 installed inside the housing 10. The touch panel 12 is configured by overlapping a touch sensor that detects a contact operation on the surface of the touch panel 12 and a display panel. The display panel of the touch panel 12 is, for example, a liquid crystal panel. The control unit 101 controls the display panel of the touch panel 12 to display characters and images. Furthermore, the control unit 101 detects the contact operation on the touch panel 12 and specifies an operation position of the contact operation. The control unit 101 causes the touch panel 12 to display information regarding the progress of recording by the recording device 1 and the remaining amount of a liquid to be ejected during the recording. Furthermore, the control unit 101 displays information related to replacement times of consumables of the first deodorization portion 20 and the second deodorization portion 50, which will be described below. The control unit 101 causing the touch panel 12 to display information is an example of notification.

Figure 2:
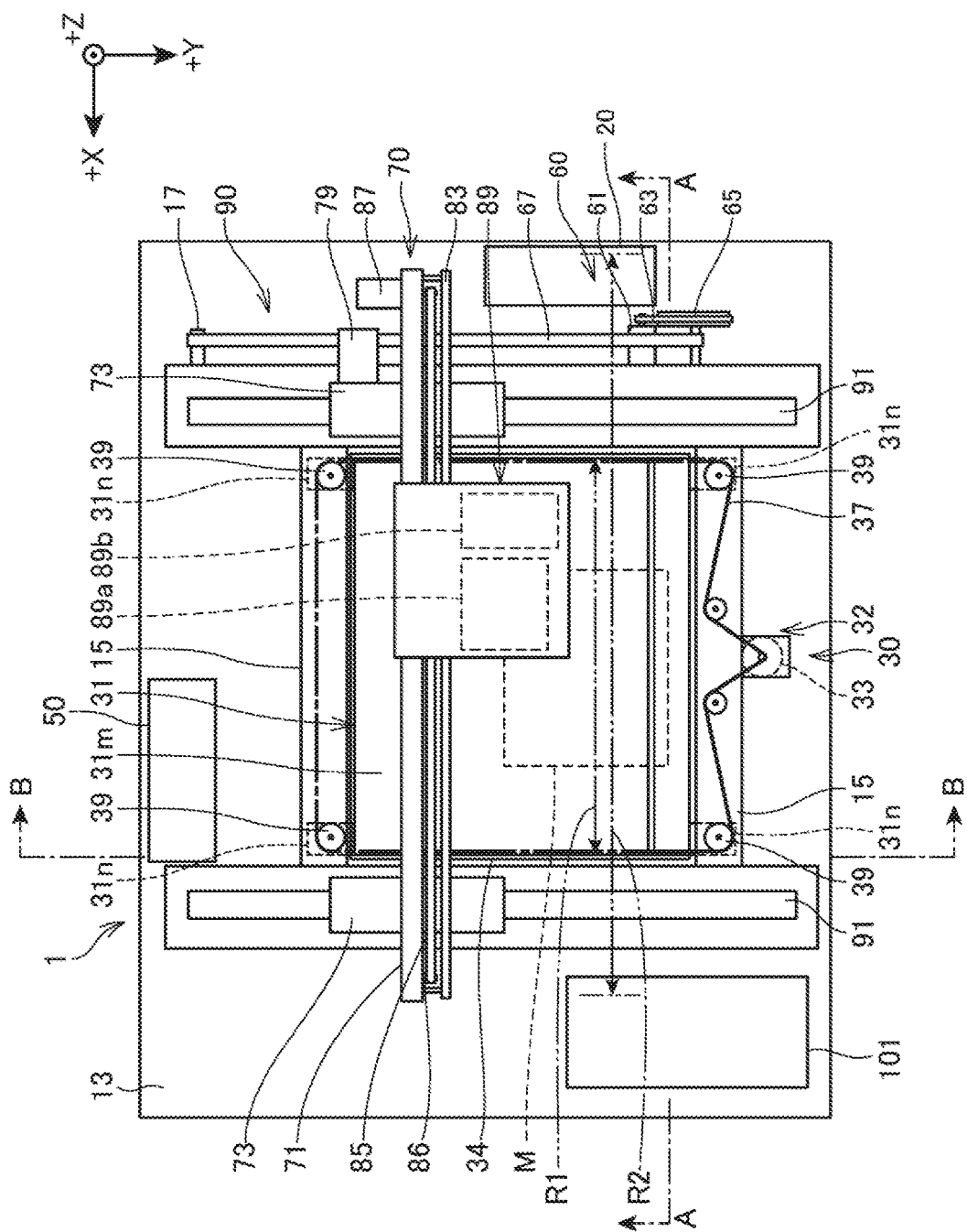
FIG. 2 is a plan view of a recording device.
Figure 3:
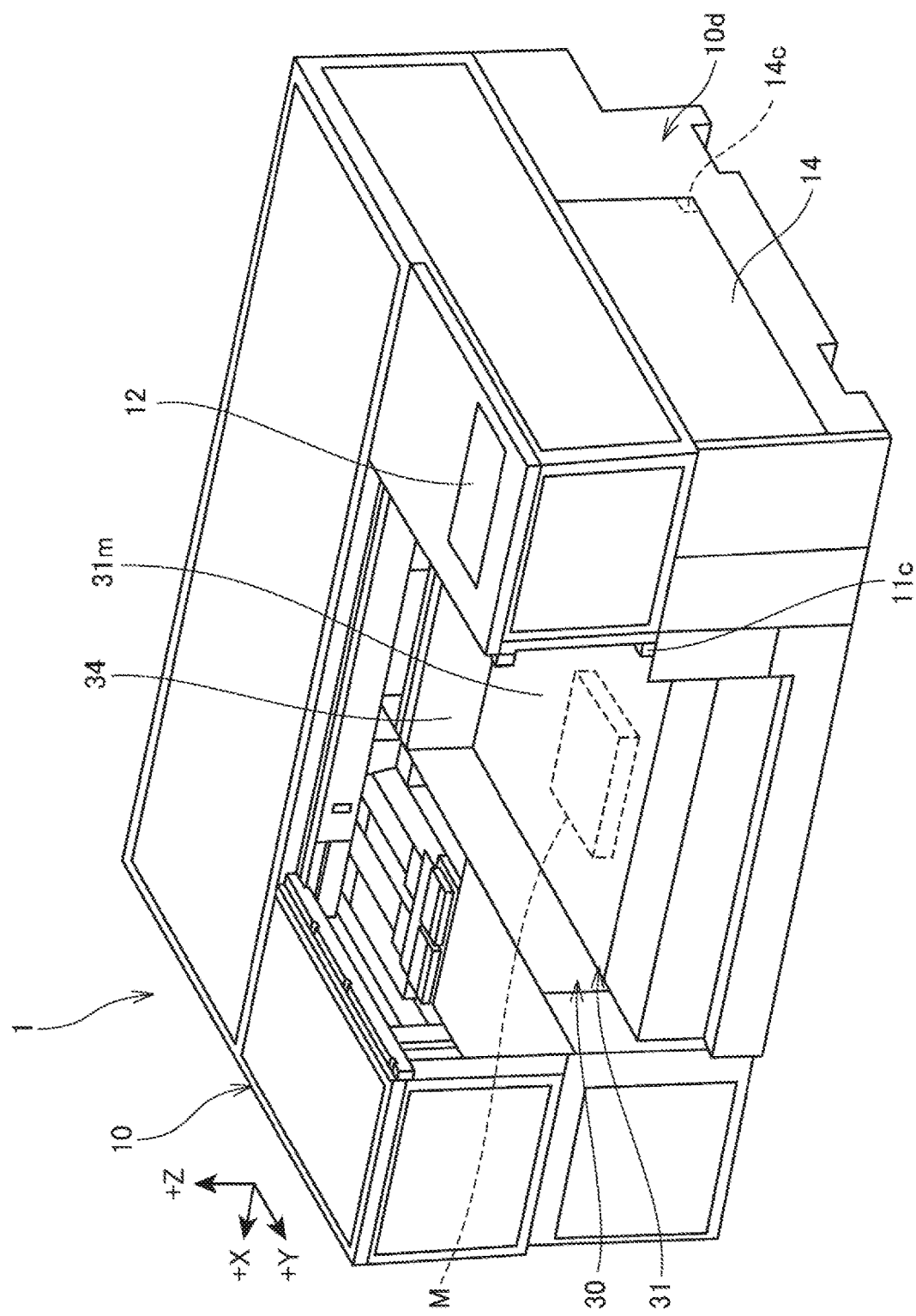
FIG. 3 is a perspective view of a recording device.

FIG. 2 is a plan view of the recording device 1 and schematically illustrates an internal structure of the recording device 1. FIG. 3 is a perspective view of the recording device 1. FIG. 3 illustrates a state in which the front surface cover 11 is removed for convenience of description.

As illustrated in FIG. 2, the recording device 1 includes a pair of base members 15, a pair of guide shafts 91, the first deodorization portion 20, the medium support portion 30, the second deodorization portion 50, a driving mechanism 90, and a movement unit 70. Each of the base members 15 is a member extending in the left-right direction. The two base members 15 are arranged side by side in the front-rear direction on the bottom plate 13, and are fixed to the bottom plate 13. Each of the guide shafts 91 is a shaft extending in the front-rear direction, and the two guide shafts 91 are respectively arranged side by side in the left-right direction so as to straddle the two base members 15.

The first deodorization portion 20 and the second deodorization portion 50 suck air inside the housing 10 and remove an odor contained in the sucked air to deodorize the air and discharge the air to the outside of the housing 10. Details of the first deodorization portion 20 and the second deodorization portion 50 will be described later.

Figure 4:
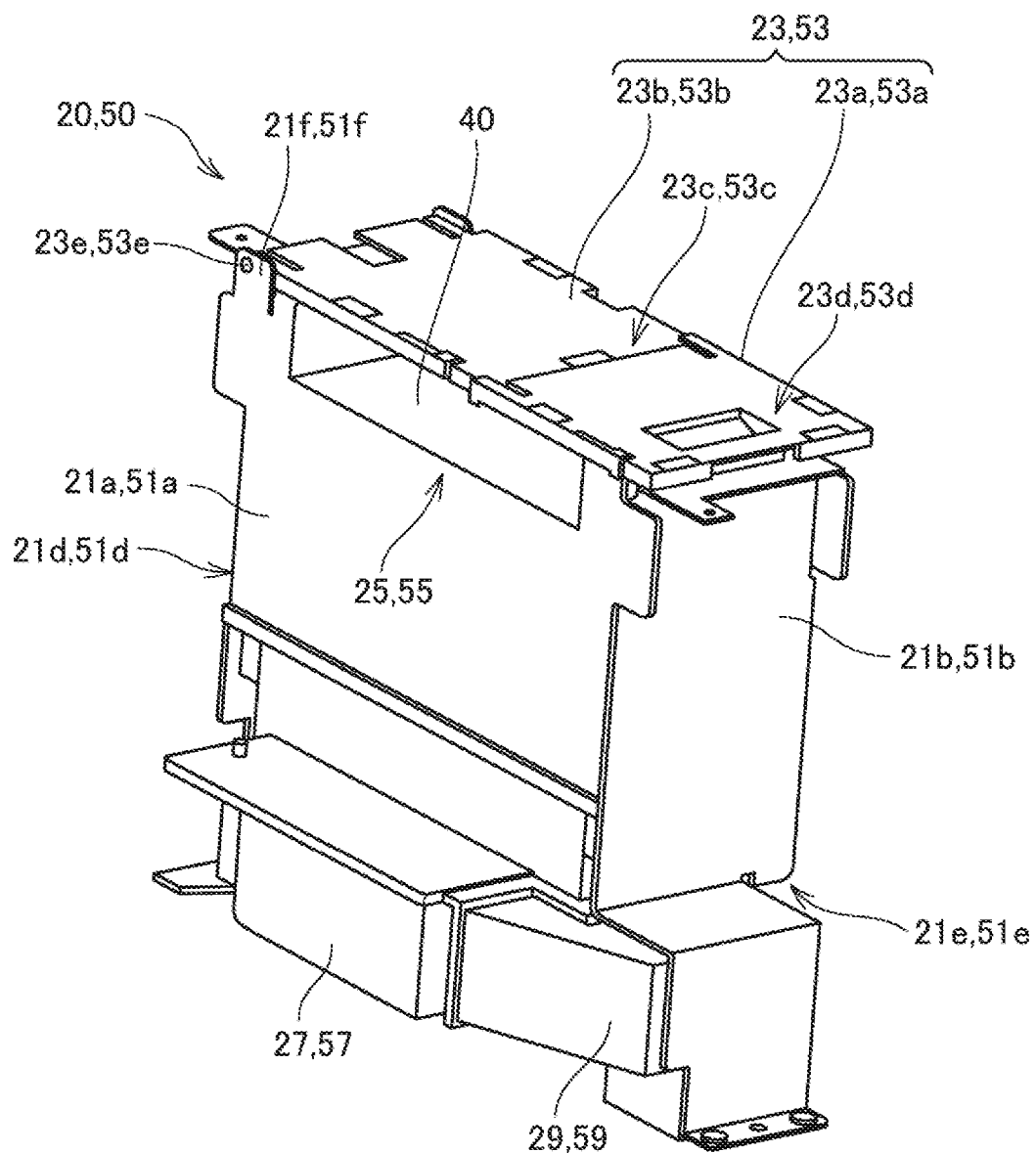
FIG. 4 is a perspective view of a deodorization portion.

The medium support portion 30 supports the medium M which is a recording target in the recording device 1. As illustrated in FIGS. 2 to 4, the medium support portion 30 includes a table 31, a fall prevention plate 34, and a height moving mechanism 32. The table 31 is disposed at a position surrounded by a pair of the base members 15 and a pair of the guide shafts 91 in plan view. The table 31 includes a support surface 31m which is a rectangular surface extending along the X-axis and the Y-axis, and facing upward.

The support surface 31m is a surface on which the medium M is placed in the medium support portion 30, and supports the medium M placed at the support surface 31m. As illustrated in FIG. 3, in a state in which the front surface cover 11 is opened, the support surface 31m is exposed to the front side and the upper side of the housing 10. Therefore, in a state in which the front surface cover 11 is opened, the medium M outside the housing 10 can be set on the support surface 31m of the medium support portion 30 from the front side of the support surface 31m. Furthermore, in a state in which the front surface cover 11 is opened, the medium M placed on the support surface 31m of the medium support portion 30 can be taken out at the outside of the housing 10.

The table 31 includes protruding portions 31n protruding outward from the support surface 31m in plan view, at lower portions of four corners of the support surface 31m. The table 31 is supported so as to be movable up and down with respect to the base members 15 by fixing the protruding portions 31n to lifting mechanisms 39 to be described later.

The fall prevention plate 34 is a plate member that is vertically erected in contact with the left side, the right side, and the rear side of the support surface 31m. In other words, the fall prevention plate 34 is perpendicular to the support surface 31m and surrounds the support surface 31m in the left-right direction and on the rear side along the end of the support surface 31m, and the front side of the support surface 31m is open without the fall prevention plate 34.

For example, the fall prevention plate 34 is formed by bending a single sheet metal. For example, the fall prevention plate 34 is disposed around the support surface 31m such that the medium M that are significantly smaller than the support surface 31m do not fall from the support surface 31m. The support surface 31m can be lifted and lowered as to described later, and the fall prevention plate 34 is fixed so as not to be lifted and lowered. The fall prevention plate 34 extends over a range from a lowest position to a highest position of the support surface 31m in a height direction. Therefore, it can be said that at least a part of the fall prevention plate 34 is positioned higher than the support surface 31m in a case where the support surface 31m is located at the lowest position.

The height movement mechanism 32 moves the table 31 up and down. When the height movement mechanism 32 moves the table 31 up and down, the support surface 31m can be moved up and down and the medium M supported on the support surface 31m can be lifted and lowered. The height movement mechanism 32 includes a lifting motor 33, a lifting belt 37, and the lifting mechanisms 39. Each of the lifting mechanisms 39 includes a ball screw disposed along the vertical direction, a nut screwed onto the ball screw, and a pulley. The ball screw of the lifting mechanism 39 is rotatably supported by each of the base members 15. The nut of the lifting mechanism 39 is fixed to each of the protruding portions 31n of the table 31. The recording device 1 includes, for example, a set of the lifting mechanisms 39 each including a ball screw, a nut, and a pulley, the lifting mechanisms 39 respectively corresponding to four protruding portions 31n provided at four corners of the table 31. The pulley of the lifting mechanism 39 is fixed to an upper portion of the ball screw. When the pulley of the lifting mechanism 39 rotates, the ball screw rotates, and the protruding portion 31n moves along the vertical direction together with the nut in accordance with the rotation of the ball screw.

The lifting motor 33 is a motor that rotates under the control of the control unit 101. The control unit 101 controls a rotation direction and rotation speed of the lifting motor 33. The lifting belt 37 is an annular belt wound around an output shaft of the lifting motor 33 and the pulleys of four lifting mechanisms 39. The lifting belt 37 is driven to circulate by the rotation of the lifting motor 33. The lifting belt 37 transmits the rotation of the lifting motor 33 to the pulleys of the four lifting mechanisms 39. In this way, the ball screws of the lifting mechanisms 39 rotate to move the table 31 along the vertical direction. Since the four lifting mechanisms 39 are operated in conjunction with each other by the lifting belt 37 to move the table 31, for example, the table 31 can be lifted and lowered while the support surface 31m is kept horizontal.

The rotation direction of the lifting motor 33 can be switched between a forward direction in which the table 31 is moved upward and a reverse direction in which the table 31 is moved downward. The recording device 1 lifts and lowers the table 31 by operating the lifting motor 33.

The driving mechanism 90 includes a pair of the guide shafts 91 and a frame driving unit 60. Each of the guide shafts 91 is a shaft-like member extending over a pair of the base members 15 and disposed along the front-rear direction.

The frame driving unit 60 includes a frame moving motor 61, a transmission belt 63, a speed change mechanism 65, and a transmission belt 67. The frame moving motor 61 is a motor that rotates under the control of the control unit 101. The transmission belt 63 is an annular belt stretched between an output shaft of the frame moving motor 61 and the speed change mechanism 65, and transmits a driving force of the frame moving motor 61 to the speed change mechanism 65. The speed change mechanism 65 includes a first pulley and a second pulley. The transmission belt 63 is wound around the first pulley, and the transmission belt 67 is wound around the second pulley. The speed change mechanism 65 drives the transmission belt 67 by rotating the second pulley with the driving force transmitted from the transmission belt 63 to the first pulley. The speed change mechanism 65 transmits the driving force of the frame moving motor 61 to the transmission belt 67 at a deceleration ratio corresponding to a ratio between the diameter of the first pulley and the diameter of the second pulley.

The transmission belt 67 is an annular belt stretched between the speed change mechanism 65 and a frame moving pulley 17 disposed at an end portion of the base member 15 in a rear direction. The frame moving pulley 17 is a pulley that is installed so as to freely rotate with respect to the base member 15. The transmission belt 67 is disposed along the guide shaft 91.

The movement unit 70 includes a main frame 71, a pair of legs 73, and a carriage 89. The main frame 71 is a plate member that is long in the left-right direction. A pair of the legs 73 are fitted to a pair of the guide shafts 91, and are movable along the guide shafts 91. The main frame 71 is fixed to the top of a pair of the legs 73, and is supported by a pair of the legs 73 from below. The main frame 71 moves together with a pair of the legs 73 in the front-rear direction while being guided by a pair of the guide shafts 91.

Of a pair of the legs 73, a leg 73 supporting the left end of the main frame 71 is fixed to the transmission belt 67 via a belt coupling portion 79. Thus, when the transmission belt 67 is driven to circulate, power for moving the legs 73 in the front-rear direction is applied to the legs 73. In this way, the movement unit 70 moves in the front-rear direction. Note that the lower end of the main frame 71 is positioned higher than the support surface 31*m* in a case where the table 31 is positioned at an uppermost position. Thus, the main frame 71 moves in the front-rear direction above the support surface 31*m*, without interfering with the support surface 31*m*.

The rotation direction of the frame moving motor 61 can be switched between a forward direction in which the main frame 71 moves in the front direction, and a reverse direction in which the main frame 71 moves in the rear direction. The recording device 1 moves the main frame 71 forward and rearward by operating the frame moving motor 61.

The carriage 89 is a substantially cuboid box, and is supported by the main frame 71 via a carriage guide shaft 83. The carriage guide shaft 83 is a shaft-like member fixed to the main frame 71 and extends in the left-right direction along the main frame 71. The carriage guide shaft 83 supports the carriage 89 such that the carriage 89 is movable in the left-right direction. Note that the lower end of the carriage 89 is positioned higher than the support surface 31*m* in a case where the table 31 is positioned at the uppermost position. Thus, the carriage 89 moves above the support surface 31*m* in the front-rear direction and the left-right direction, without interfering with the support surface 31*m*.

Furthermore, the carriage 89 is coupled to a carriage driving belt 85. The carriage driving belt 85 is an annular belt disposed along the carriage guide shaft 83 by having one end wound around a carriage driving pulley 86 and the other end wound around an output shaft of a carriage driving motor 87. The carriage driving pulley 86 is a pulley that is rotatably fixed to the right end of the main frame 71. The carriage driving motor 87 is a motor that is fixed to the left end of the main frame 71 and rotates the output shaft thereof under the control of the control unit 101. The carriage driving motor 87 rotates the output shaft to drive the carriage driving belt 85 to circulate. In this way, the carriage driving motor 87 moves the carriage 89 coupled to the carriage driving belt 85 in the left-right direction along the carriage guide shaft 83.

The driving mechanism 90, the carriage driving belt 85, the carriage driving pulley 86, and the carriage driving motor 87 correspond to an example of a moving mechanism that relatively moves the carriage 89 with respect to the medium M.

The carriage 89 includes the recording head 89*a* and the irradiation unit 89*b*. The recording head 89*a* includes a plurality of nozzles (not illustrated) that open downward from the lower end surface of the carriage 89. The recording head 89*a* ejects a liquid from these nozzles by driving piezoelectric actuators (not illustrated). When the recording head 89*a* ejects the liquid from the nozzles, the ejected liquid flies between the nozzles and the medium M placed at the table 31 and lands on the medium M. Note that in the present embodiment, the liquid ejected from the nozzle of the recording head 89*a* is an ink to be cured by an ultraviolet ray. The recording head 89*a* records characters and images formed by the liquid on the medium M, by causing the liquid to land on the medium M on the medium support portion 30. The recording head 89*a* corresponds to an example of a recording unit.

The irradiation unit 89*b* includes an irradiation window (not illustrated) facing downward from the lower end surface of the carriage 89. The irradiation window is constituted by a plate made of a light-transmissive material. The irradiation unit 89*b* emits irradiation light from a light-source unit (not illustrated) through the irradiation window. The irradiation light emitted from the irradiation unit 89*b* passes between the irradiation window and the medium M placed at the table 31, and is emitted onto the medium M on which the recording has been performed by the recording head 89*a*. In the present embodiment, the irradiation unit 89*b* is provided with an ultraviolet light emitting diode (UV-LED) that emits ultraviolet rays, and the irradiation light is the ultraviolet ray. In other words, in the present embodiment, the irradiation unit 89*b* emits the ultraviolet ray to the ink that has landed on the medium M and is cured by the ultraviolet ray, and thus the ink is fixed onto the medium M.

The ink ejected from the recording head 89*a* is a so-called UV ink which is cured by being irradiated with the ultraviolet ray. Some UV inks have a unique odor. When the recording device 1 performs recording on the medium M by using the ink, the odor of the ink floats inside the housing 10. As the recording head 89*a* moves in the front-rear direction and the left-right direction at the time of recording, the odor of the ink is diffused inside the housing 10. The first deodorization portion 20 and the second deodorization portion 50 remove an odor emitted from the ink by sucking air inside the housing 10, and discharge cleaned air.

As illustrated in FIG. 2, the first deodorization portion 20 is disposed on the left side of the medium support portion 30. The first deodorization portion 20 is located within a range R1 in which the carriage 89 moves in the left-right direction. In the range R1, a range in which the recording head 89a performs recording on the medium M is referred to as a recording range R2. The recording range R2 is a range in which the recording head 89a faces the support surface 31m in a direction along the X-axis. In the range R1, a range other than the recording range R2 is set as a retraction range. In the retraction range, the recording head 89a does not face the support surface 31m. As illustrated in FIG. 2, the first deodorization portion 20 is disposed such that at least a part of the first deodorization portion 20 is located in the retraction range. The position of the first deodorization portion 20 is close to the position of the recording head 89a when the recording head 89a ejects the ink, and is a position that does not interfere with the ejecting of the ink from the recording head 89a. Therefore, by using the first deodorization portion 20, it is possible to efficiently deodorize the odor of the ink used for recording without affecting the recording operation of the recording device 1.

As illustrated in FIG. 2, the second deodorization portion 50 is disposed on the rear side of the medium support portion 30. The second deodorization portion 50 is positioned between a pair of the guide shafts 91 in a direction along the X-axis, and at least a part of the second deodorization portion 50 overlaps the support surface 31m. The second deodorization portion 50 is positioned behind the table 31 in a direction along the Y-axis. Furthermore, the second deodorization portion 50 is disposed on a side opposite to the front surface cover 11 with the medium support portion 30 interposed therebetween. The position of the second deodorization portion 50 is close to the position of the recording head 89a when the recording head 89a ejects the ink, and is a position that does not interfere with the ejecting of the ink from the recording head 89a. Therefore, by using the second deodorization portion 50, it is possible to efficiently deodorize the odor of the ink used for recording without affecting the recording operation of the recording device 1.

One of the first deodorization portion 20 and the second deodorization portion 50, which are two deodorization portions of the recording device 1, is located at a position aligned with the support surface 31m in the direction along the X-axis, and the other one is located at a position aligned with the support surface 31m in the direction along the Y-axis. The first deodorization portion 20 is located at a position suitable for deodorizing the odor diffused by the movement of the carriage 89 along the X-axis. The second deodorization portion 50 is located at a position suitable for deodorizing the odor diffused by the movement of the carriage 89 along the Y-axis together with the movement unit 70. As described above, the first deodorization portion 20 and the second deodorization portion 50, which are a plurality of deodorization portions, are disposed at a position aligned with the medium support portion 30 in the direction along the X-axis and at a position aligned with the medium support portion 30 in the direction along the Y-axis, and it is possible to efficiently deodorize the air inside the housing 10.

The first deodorization portion 20 and the second deodorization portion 50 are fixed to the base member 15 or the bottom plate 13 by means of a screw.

In the configuration illustrated in FIG. 2, the first deodorization portion 20 and the second deodorization portion 50 are disposed such that at least a part of the medium support portion 30 overlaps a position between the first deodorization portion 20 and the second deodorization portion 50 in plan view. With this configuration, it is possible to more efficiently deodorize the odor of the ink ejected from the recording head 89a to the medium support portion 30.

In the configuration illustrated in FIG. 2, in a configuration in which the medium support portion 30 has the rectangular table 31, the first deodorization portion 20 and the second deodorization portion 50 are disposed so as to correspond to any of four sides constituting the peripheral edge of the table 31.

In other words, the first deodorization portion 20 and the second deodorization portion 50 are disposed so as to face any one of four sides constituting the peripheral edge of the table 31. In this configuration, the first deodorization portion 20 and the second deodorization portion 50 are disposed such that the side of the table 31 facing the first deodorization portion 20 and the side of the table 31 facing the second deodorization portion 50 do not face each other.

Furthermore, in the configuration illustrated in FIG. 2, the first deodorization portion 20 and the second deodorization portion 50 are disposed so as not to face each other with the medium support portion 30 interposed therebetween.

2. Configuration of Deodorization Portion

Figure 5:
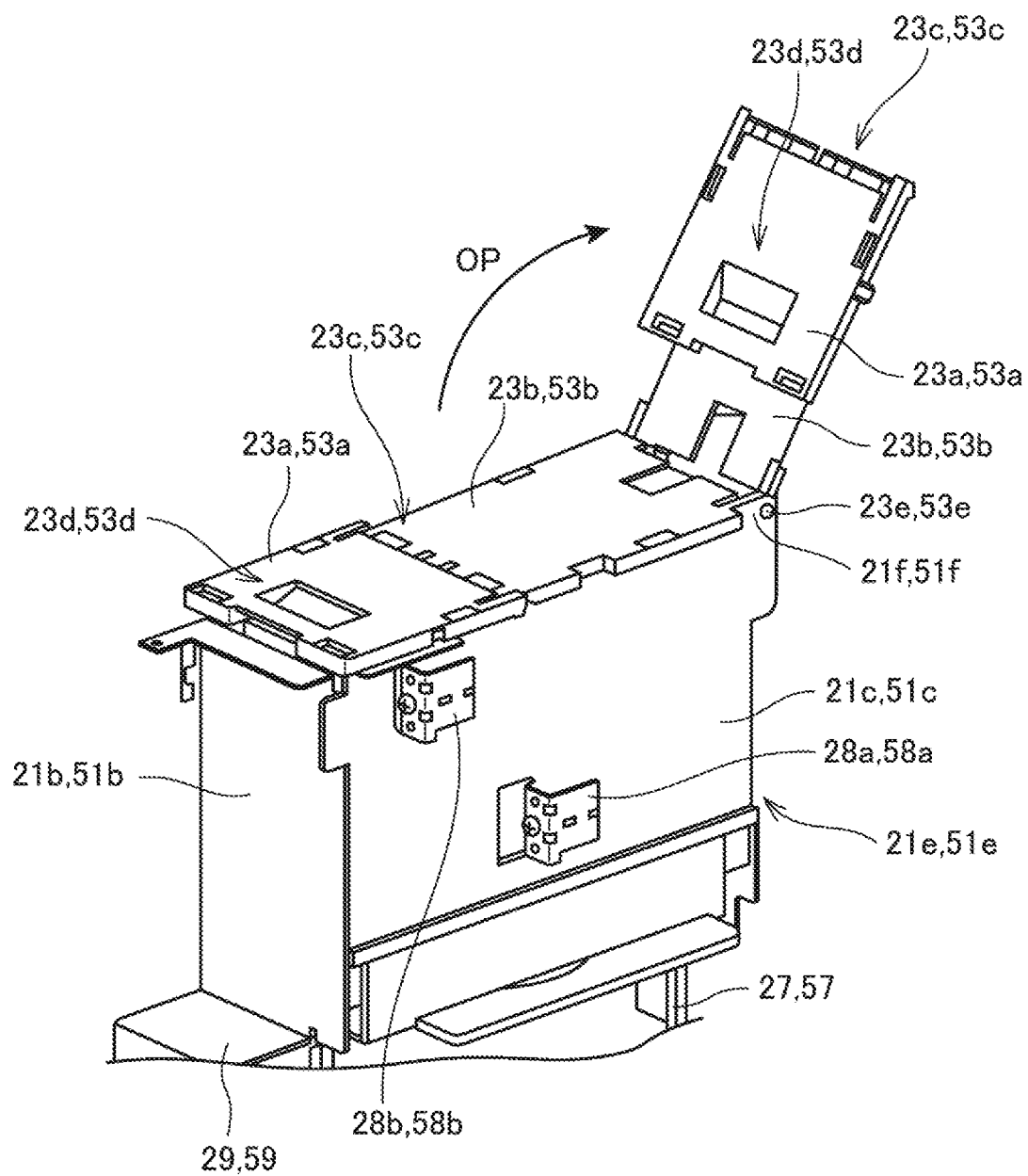
FIG. 5 is a perspective view of a deodorization portion.

FIGS. 4 and 5 are perspective views of the deodorization portion. FIG. 4 is a front perspective view of the deodorization portion, and FIG. 5 is a rear perspective view of the deodorization portion.

The first deodorization portion 20 and the second deodorization portion 50 have a common configuration. Hereinafter, the configuration of the first deodorization portion 20 will be described, but the description is also applied to the second deodorization portion 50.

The up-down direction in FIGS. 4 and 5 corresponds to the up-down direction in a case where the first deodorization portion 20 and the second deodorization portion 50 are installed in the recording device 1.

The first deodorization portion 20 has a substantially box-like accommodation portion 21. A front surface 21a, a side surface 21b, a side surface 21d, a back surface 21c, and a bottom surface 21e, which constitute the accommodation portion 21, are made of a surface material formed of an incombustible or flame-retardant material. For example, the accommodation portion 21 is made by a metal plate such as a steel plate. The upper surface of the accommodation portion 21 is open, and a lid portion 23 is disposed so as to cover the opening.

The front surface 21a is a surface facing the back surface 21c, and the side surface 21b is a surface facing the side surface 21d. A lid support portion 21f is provided at the upper end of the side surface 21b and the upper end of the side surface 21d. The lid support portion 21f protrudes toward the outside of the accommodation portion 21 at the side surface 21b and the side surface 21d. The lid support portion 21f on the side surface 21b side and the lid support portion 21f on the side surface 21d side face each other.

The lid portion 23 has a distal end panel 23a and a proximal end panel 23b, and has a configuration in which the distal end panel 23a and the proximal end panel 23b are connected by a hinge portion 23c. A proximal end portion of the proximal end panel 23b is rotatably connected to the lid support portion 21f of the side surface 21b and the lid support portion 21f of the side surface 21d via a support portion 23e. The distal end portion of the proximal end panel 23b is rotatably connected to the proximal end portion of the distal end panel 23a by the hinge portion 23c. Therefore, the distal end panel 23a and the proximal end panel 23b are rotatable with respect to each other, and the proximal end panel 23b is rotatable with respect to the accommodation portion 21. For example, the distal end panel 23a and the proximal end panel 23b are made of synthetic resins. Furthermore, similarly to the front surface 21a, the side surface 21b, the side surface 21d, the back surface 21c, and the bottom surface 21e, the distal end panel 23a and the proximal end panel 23b may be made of a surface material formed of an incombustible or flame-retardant material.

A recess 23d is formed on the distal end panel 23a. The recess 23d is used for a user to hook his/her finger when the user opens the lid portion 23.

A first intake port 25 is open in an upper portion of the accommodation portion 21. The first intake port 25 is an opening formed by cutting out a part of the upper portion of the front surface 21a. In the present embodiment, the first intake port 25 is formed only on the front surface 21a and is not formed on the back surface 21c. The front surface 21a is a surface facing the medium support portion 30 in a state in which the first deodorization portion 20 is installed in the recording device 1. It is also possible to adopt a configuration in which the first intake port 25 is provided on a surface other than the front surface 21a in the accommodation portion 21. However, by providing the first intake port 25 only on the front surface 21a, the air flow in the first deodorization portion 20 is limited in a specific direction, and the deodorization by the first deodorization portion 20 can be performed more efficiently.

A deodorization unit 40 is accommodated in the accommodation portion 21. Since the first intake port 25 is open on the side surface 21b, the upper surface of the deodorization unit 40 is exposed to the inside of the housing 10. The deodorization unit 40 is removably accommodated in the accommodation portion 21, and the deodorization unit 40 can be replaced. On the other hand, a first air blower 27 is attached to a lower portion of the accommodation portion 21. The first air blower 27 includes a fan (not illustrated) and a casing surrounding the fan. The fan of the first air blower 27 faces the inside of the accommodation portion 21 through an opening (not illustrated) formed on the bottom surface 21e. An opening is provided in a casing of the first air blower 27, and a duct 29 is connected to the first air blower 27 so as to cover the opening.

The first air blower 27 sucks air inside the accommodation portion 21 and discharges the air to the duct 29. The duct 29 guides the discharged air from the first air blower 27 to the lower side of the first deodorization portion 20. By the operation of the first air blower 27, the air inside the housing 10 is sucked from the first intake port 25. This air passes through the inside of the accommodation portion 21, passes through the first air blower 27 and the duct 29, and is discharged from the lower side of the first deodorization portion 20.

As described above, the first deodorization portion 20 and the second deodorization portion 50 have a common configuration. For example, the second deodorization portion 50 includes an accommodation portion 51 corresponding to the accommodation portion 21, a lid portion 53 corresponding to the lid portion 23, a second air blower 57 corresponding to the first air blower 27, and a duct 59 corresponding to the duct 29. Similarly to the accommodation portion 21, the accommodation portion 51 has a front surface 51a, a side surface 51b, a side surface 51d, a back surface 51c, and a bottom surface 51e, and a second intake port 55 is open on the front surface 51a of the upper portion of the accommodation portion 51. Similarly to the lid portion 23, the lid portion 53 includes a distal end panel 53a, a proximal end panel 53b, a hinge portion 53c, a recess 53d, and a support portion 53e. As illustrated in FIGS. 4 and 5, these components correspond to the components of the first deodorization portion 20.

The deodorization unit 40 is accommodated in the accommodation portion 51. The deodorization unit 40 is removably accommodated in the accommodation portion 51, and the deodorization unit 40 can be replaced. As the deodorization unit 40 accommodated in the accommodation portion 51 and the deodorization unit 40 accommodated in the accommodation portion 21, a common unit can be used. That is, the deodorization unit 40 can be attached to both the first deodorization portion 20 and the second deodorization portion 50.

3. Configuration of Deodorization Unit

Figure 6:
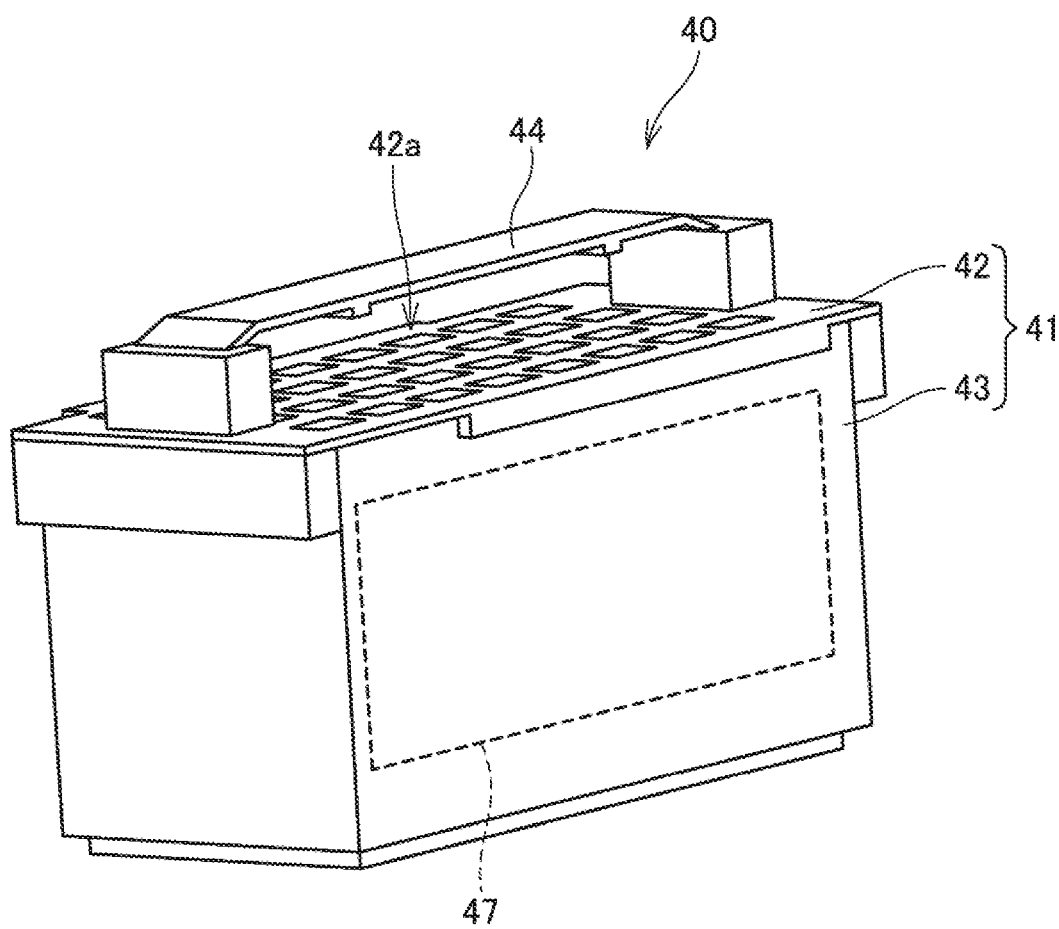
FIG. 6 is a perspective view of a deodorization unit.
Figure 7:
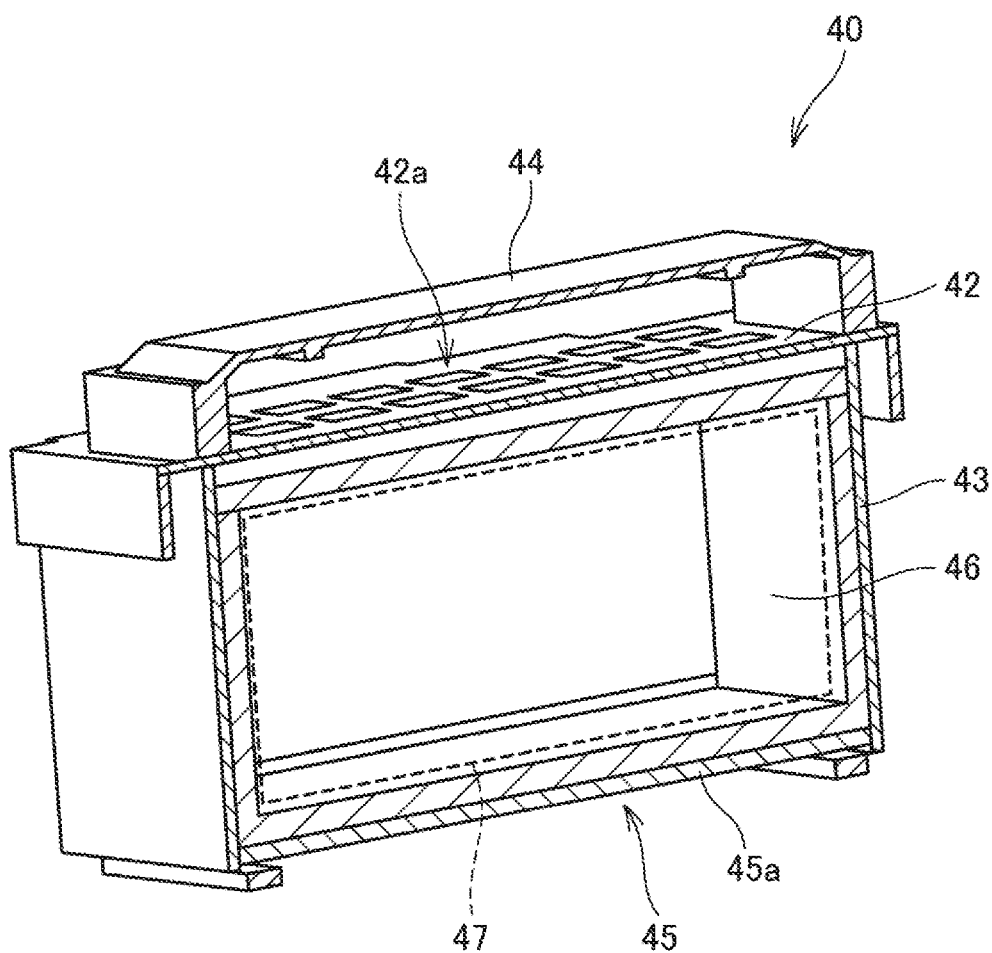
FIG. 7 is a cross-sectional view of a main part of a deodorization unit.

FIG. 6 is a perspective view of the deodorization unit 40, and FIG. 7 is a cross-sectional view of a main part of the deodorization unit 40.

The deodorization unit 40 has a deodorization body cover 41. The deodorization body cover 41 has an upper cover 42 constituting the upper surface of the deodorization body cover 41 and a cover body 43. The cover body 43 is a substantially box-like container, and as illustrated in FIG. 7, a support member 46 is disposed on the inner surface of the cover body 43. The cover body 43 accommodates a deodorization body 47.

The deodorization body 47 is an adsorbent adsorbing a substance emitting an odor or a decomposing agent for decomposing a substance emitting an odor. Examples of the adsorbent include activated carbon and zeolite. Examples of the decomposing agent include a catalyst using platinum or the like supported on a carrier made of ceramics or the like. The support member 46 holds the deodorization body 47 such that the deodorization body 47 does not move inside the cover body 43. The support member 46 may be made of an elastic material. In this case, the support member 46 has a function of protecting the deodorization body 47 from impact.

An opening (not illustrated) is formed on the bottom surface of the cover body 43. Upper surface vent holes 42a are open on the upper cover 42. These openings allow air to flow between the space inside the cover body 43 and the outside thereof.

A handle 44 is attached to the upper cover 42. By holding the handle 44, the user can lift the deodorization unit 40 without touching the deodorization body 47.

In a state in which the deodorization unit 40 is accommodated in the first deodorization portion 20, the air flowing into the accommodation portion 21 from the first intake port 25 is sent to the deodorization body 47 through the upper surface vent holes 42a by the operation of the first air blower 27. After this air passes through the deodorization body 47, the air is discharged from the opening provided on the bottom surface of the cover body 43 and flows to the first air blower 27 through the bottom surface 21e.

The front surface 21a, the side surface 21b, the back surface 21c, the side surface 21d, and the bottom surface 21e, which constitute the accommodation portion 21, are made of an incombustible or flame-retardant material. Similarly, the front surface 51a, the side surface 51b, the back surface 51c, the side surface 51d, and the bottom surface 51e, which constitute the accommodation portion 51, are made of an incombustible or flame-retardant material. In a case where a combustible material such as activated carbon is used as the deodorization body 47, it is necessary to consider the risk of ignition of the deodorization body 47. In the recording device 1, since five surfaces of the accommodation portion 21 and the accommodation portion 51 are formed of an incombustible or flame-retardant material, it is possible to minimize the risk when the deodorization body 47 is ignited. Thus, a combustible material can be used as the deodorization body 47. Therefore, the degree of freedom of selection of the deodorization body 47 is high, and efficient deodorization can be achieved by using the deodorization body 47 suitable for the ink which is an odor source.

4. Replacement of the Deodorization Unit

In the first deodorization portion 20 and the second deodorization portion 50, the deodorization unit 40 is replaceable. That is, the user can take out the deodorization unit 40 attached to the first deodorization portion 20 and set a new deodorization unit 40 in the first deodorization portion 20. When the operation of replacing the deodorization unit 40 is performed, the user can easily use the deodorization unit 40 by holding the handle 44.

As illustrated in FIG. 5, when the user hooks his/her finger on the recess 23d and lifts the distal end panel 23a, the lid portion 23 rotates about the support portion 23e in an OP direction of FIG. 5. Thus, the lid portion 23 is lifted and the upper surface of the accommodation portion 21 is opened. In a state in which the lid portion 23 is opened, by rotating the distal end panel 23a about the hinge portion 23c, the lid portion 23 can be folded such that the distal end panel 23a and the proximal end panel 23b overlap with each other as illustrated in FIG. 5. Note that FIG. 5 illustrates the lid portion 23 in both a state in which the lid portion 23 is closed and a state in which the lid portion 23 is opened.

Since the upper portion of the accommodation portion 21 is opened in a state in which the lid portion 23 is opened, the user can perform an operation of taking out the deodorization unit 40 from the accommodation portion 21 and an operation of inserting the deodorization unit 40 into the accommodation portion 21. Thus, in the first deodorization portion 20 and the second deodorization portion 50, the deodorization unit 40 can be easily replaced. In the operation of replacing the deodorization unit 40, the user can take out and attach the deodorization unit 40 by holding the handle 44 with a hand. Thus, replacement of the deodorization unit 40 can be performed with a simple operation.

As illustrated in FIGS. 1 and 3, a side surface cover 14 is provided on a left side surface 10d of the housing 10 so as to correspond to a position at which the first deodorization portion 20 is provided. The side surface cover 14 is rotatably connected to the left side surface 10d by an upper end hinge thereof. Therefore, the side surface cover 14 can be opened upward from below. Furthermore, the side surface cover 14 may have a configuration in which the lower end of the side surface cover 14 is rotatably connected to the bottom plate 13 such that the side surface cover 14 can be opened by being rotated downward. The front surface cover 11 and the side surface cover 14 correspond to an example of a cover.

By opening the side surface cover 14, the first deodorization portion 20 is exposed to the left side surface 10d. The user can replace the deodorization unit 40 by opening the lid portion 23 in a state in which the side surface cover 14 is opened.

On the other hand, the second deodorization portion 50 is positioned behind the medium support portion 30. As illustrated in FIG. 3, in a state in which the front surface cover 11 is opened, the second deodorization portion 50 is exposed to the inner side of the housing 10. The user can open the front surface cover 11, open the lid portion 23 by inserting his/her hand into the back of the housing 10, and replace the deodorization unit 40 of the second deodorization portion 50.

5. Arrangement of Deodorization Portion

Figure 8:
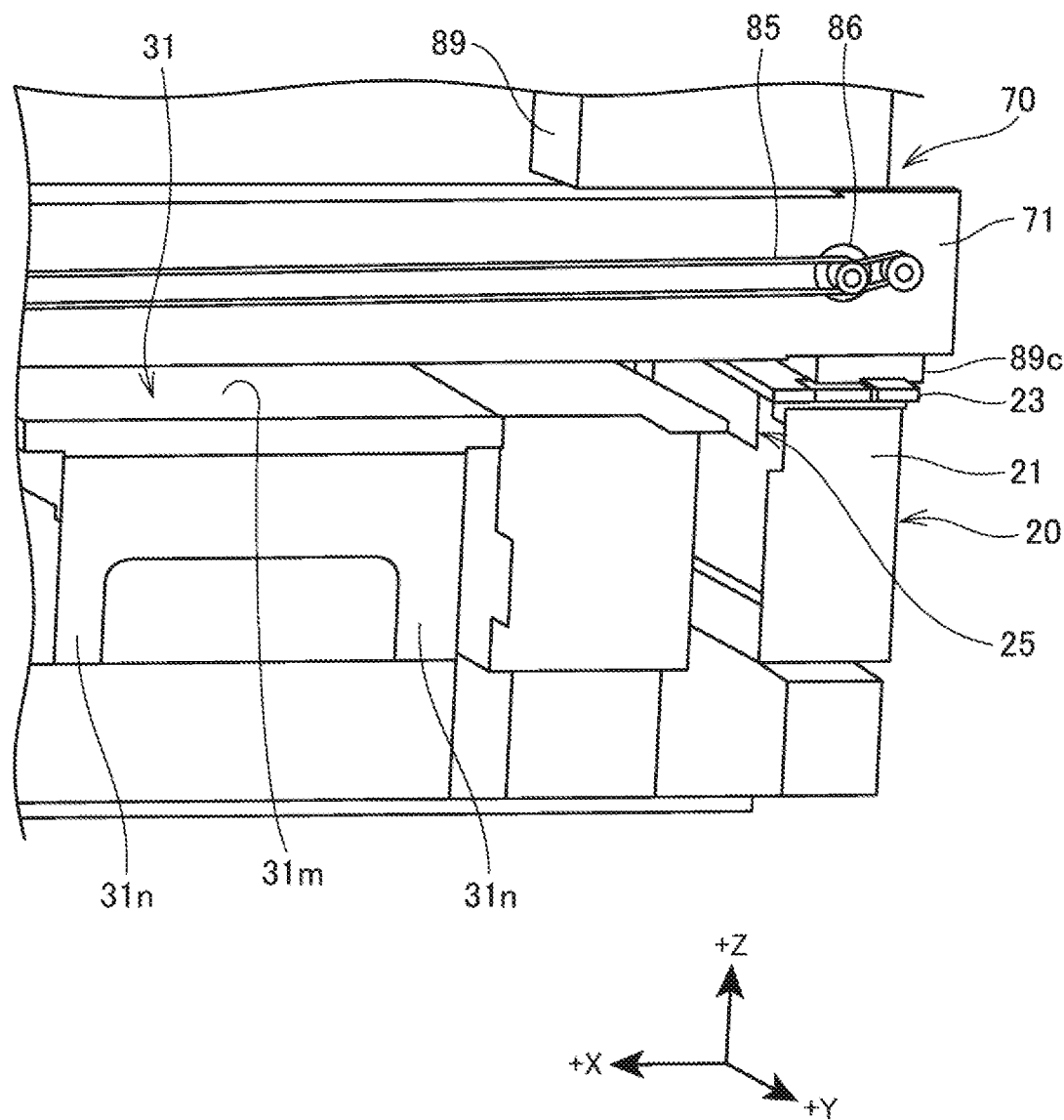
FIG. 8 is a cross-sectional view of a main part of a recording device.

FIG. 8 is a cross-sectional view of a main part of the recording device 1, and illustrates the left portion of the recording device 1 in a cross-sectional view taken along line A-A in FIG. 2.

The first deodorization portion 20 is positioned outside the recording range R2 in the range R1 in which the carriage 89 moves in the left-right direction. Thus, as illustrated in FIG. 8, in a case where the carriage 89 is positioned at the left end of the range R1, the first deodorization portion 20 is positioned directly below the carriage 89. The upper end of the first deodorization portion 20 is located below the carriage 89. Therefore, it is possible to install the first deodorization portion 20 in the range R1 without disturbing the recording operation of the recording device 1, and it is possible to reduce the size of the recording device 1.

The first deodorization portion 20 is disposed such that the first intake port 25 faces the table 31. That is, in the first deodorization portion 20, the first intake port 25 is open to the front surface 21a facing the table 31. Thus, the air containing the odor of the ink ejected from the recording head 89a to the medium M placed at the table 31 can be efficiently taken in from the first intake port 25.

FIG. 8 illustrates a state in which the table 31 is positioned at the lowermost portion in the range in which the table 31 can be lifted and lowered. When air is sucked from the first intake port 25 by the power of the first air blower 27, an air flow from the support surface 31m toward the first intake port 25 is generated. When the first intake port 25 is located at a position higher than the support surface 31m, the air flow from the support surface 31m toward the first intake port 25 becomes strong. Therefore, the motion of the ink ejected by the recording head 89a and the state of the ink on the surface of the recording head 89a may be affected. Therefore, it is preferable that the first intake port 25 is installed such that the upper end of the first intake port 25 is located at a position lower than the support surface 31m of the table 31 in the height direction. That is, it is preferable that the first intake port 25 is located at a position not overlapping the support surface 31m in the height direction.

Figure 9:
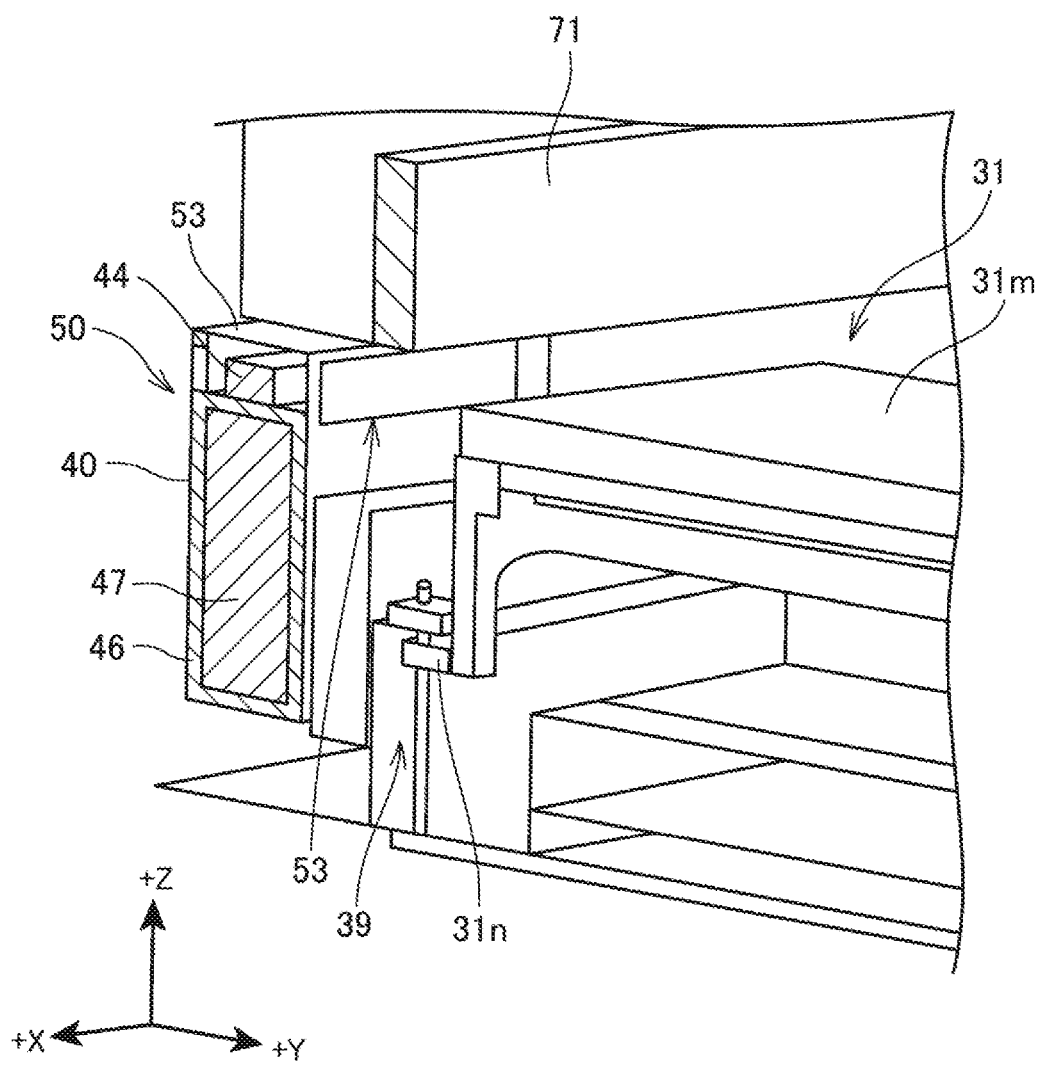
FIG. 9 is a cross-sectional view of a main part of a recording device.

FIG. 9 is a cross-sectional view of a main part of the recording device 1, and illustrates the rear portion of the recording device 1 in a cross-sectional view taken along line B-B in FIG. 2.

The second deodorization portion 50 is positioned within or outside the range in which the movement unit 70 moves in the front-rear direction. Since the upper end of the second deodorization portion 50 is located lower than the lower end of the main frame 71, the second deodorization portion 50 can be installed in a range in which the main frame 71 moves.

As illustrated in FIG. 9, the second deodorization portion 50 is disposed behind the table 31 such that the second intake port 55 faces the table 31. That is, in the second deodorization portion 50, the second intake port 55 is open to the front surface 51a facing the table 31. Thus, the air containing the odor of the ink ejected from the recording head 89a to the medium M placed at the table 31 can be efficiently taken in from the second intake port 55.

FIG. 9 illustrates a state in which the table 31 is positioned at the uppermost portion in the range in which the table 31 can be lifted and lowered. The second deodorization portion 50 is disposed such that at least a part of the second intake port 55 overlaps the support surface 31m in the height direction in a state in which the table 31 is positioned at the uppermost portion. In other words, at least a part of the second intake port 55 is located at a position higher than the table 31. With this configuration, it is possible to efficiently take in the air containing the odor of the ink ejected onto the medium M from the second intake port 55.

As described above, the first deodorization portion 20 is positioned within the range R1 and close to the table 31. On the other hand, the second deodorization portion 50 is positioned behind the table 31. The distance from the left end of the table 31 to the first intake port 25 in the direction along the X-axis is shorter than the distance from the rear end of the table 31 to the second intake port 55 in the direction along the Y-axis. In other words, the second deodorization portion 50 is farther away from the table 31 than the first deodorization portion 20. Thus, the influence of the air flow from the support surface 31m toward the second intake port 55 on the ink is small. Therefore, it is preferable that the second intake port 55 is located at a position overlapping the support surface 31m in the height direction when the support surface 31m is positioned at the uppermost portion.

The first intake port 25 and the second intake port 55 are open at different positions in the height direction. Therefore, the first deodorization portion 20 and the second deodorization portion 50 take in the air at different positions, and thus the odor diffused inside the housing 10 can be more efficiently deodorized.

Furthermore, in the recording device 1, the first deodorization portion 20 faces the medium support portion 30 in the direction along the X-axis, and the second deodorization portion 50 faces the medium support portion 30 in one direction along the Y-axis. Therefore, it is possible to more efficiently deodorize the odor diffused inside the housing 10 by the movement of the carriage 89 with respect to the medium M.

6. Operation of Control Unit

In a case where the user replaces the deodorization unit 40, the control unit 101 may move the movement unit 70 and/or the carriage 89 in order to facilitate the replacement.

For example, in a case where replacement of the deodorization unit 40 of the first deodorization portion 20 is instructed by the user, the control unit 101 may move the movement unit 70 to a rear portion not overlapping the first deodorization portion 20. Moreover, the control unit 101 may move the carriage 89 in the rightward direction so as not to overlap the first deodorization portion 20. Thus, the user can easily open the lid portion 23 in a state in which the carriage 89 is not positioned above the first deodorization portion 20.

Furthermore, for example, in a case where replacement of the deodorization unit 40 of the second deodorization portion 50 is instructed by the user, the control unit 101 may move the movement unit 70 to a front side so as not to overlap the second deodorization portion 50. Thus, the user can easily handle the second deodorization portion 50 from the front side of the recording device 1 in a state in which the front surface cover 11 is opened, and the user can easily open the lid portion 53.

The instruction by the user is performed using, for example, the touch panel 12. The control unit 101 causes the touch panel 12 to display an operation screen. In a case where a touch operation on the operation screen is detected by the touch panel 12, the control unit 101 receives the operation as an instruction from the user.

As illustrated in FIG. 5, a first deodorization body sensor 28a and a first lid sensor 28b are disposed on the back surface 21c of the first deodorization portion 20. The first deodorization body sensor 28a is a sensor that detects whether or not the deodorization unit 40 is accommodated in the accommodation portion 21. The first lid sensor 28b is a sensor that detects whether or not the lid portion 23 is closed. The first deodorization body sensor 28a and the first lid sensor 28b are configured by, for example, a switch-type sensor, a reflective optical sensor, or the like.

Similarly, a second deodorization body sensor 58a and a second lid sensor 58b are disposed on the back surface 51c of the second deodorization portion 50. The second deodorization body sensor 58a is a sensor that detects whether or not the deodorization unit 40 is accommodated in the accommodation portion 51. The second lid sensor 58b is a sensor that detects whether or not the lid portion 53 is closed. The second deodorization body sensor 58a and the second lid sensor 58b are configured by, for example, a switch-type sensor, a reflective optical sensor, or the like.

The first deodorization body sensor 28a and the first lid sensor 28b are connected to the control unit 101. The control unit 101 can detect whether or not the deodorization unit 40 is attached to the first deodorization portion 20 based on the detection value of the first deodorization body sensor 28a. Furthermore, the control unit 101 can detect whether or not the lid portion 23 is closed based on the detection value of the first lid sensor 28b. For example, after the user replaces the deodorization unit 40 of the first deodorization portion 20, in a case where the control unit 101 detects either that the lid portion 23 is not closed or that the deodorization unit 40 is not attached, the control unit 101 can perform notification through the touch panel 12.

Similarly, the second deodorization body sensor 58a and the second lid sensor 58b are connected to the control unit 101. The control unit 101 can detect whether or not the deodorization unit 40 is attached to the second deodorization portion 50 based on the detection value of the second deodorization body sensor 58a. Furthermore, the control unit 101 can detect whether or not the lid portion 53 is closed based on the detection value of the second lid sensor 58b. For example, after the user replaces the deodorization unit 40, in a case where the control unit 101 detects either that the lid portion 53 is not closed or that the deodorization unit 40 is not attached, the control unit 101 can perform notification through the touch panel 12.

As illustrated in FIGS. 1 and 3, a front surface cover sensor 11c is attached to the front surface 10a of the housing 10. The front surface cover sensor 11c is a sensor that detects whether or not the front surface cover 11 is closed. Furthermore, a side surface cover sensor 14c is attached to the left side surface 10d. The side surface cover sensor 14c is a sensor that detects whether or not the side surface cover 14 is closed. The front surface cover sensor 11c and the side surface cover sensor 14c are connected to the control unit 101. The control unit 101 can detect whether or not the front surface cover 11 is closed based on the detection value of the front surface cover sensor 11c. Furthermore, the control unit 101 can detect whether or not the side surface cover 14 is closed based on the detection value of the side surface cover sensor 14c. For example, after the user replaces the deodorization unit 40 of the first deodorization portion 20, in a case where it is detected that the side surface cover 14 is not closed, the control unit 101 can perform notification through the touch panel 12. Furthermore, for example, after the user replaces the deodorization unit 40 of the second deodorization portion 50, in a case where it is detected that the front surface cover 11 is not closed, the control unit 101 can perform notification through the touch panel 12.

7. Other Embodiments

The above-described embodiment is merely a specific example to which the present disclosure is applied. The present disclosure is not limited to the configuration of the above-described embodiment, and can be implemented in various aspects without departing from the gist of the disclosure.

For example, in the above-described embodiment, the first air blower 27 and the second air blower 57 may be controllable by the control unit 101. In this case, a timing at which the control unit 101 operates the first air blower 27 and the second air blower 57 is arbitrary. For example, the control unit 101 may perform control such that the first air blower 27 and the second air blower 57 are not operated while the recording device 1 performs recording on the medium M and until a predetermined time elapses after completion of the recording. In this case, the control unit 101 may drive the first air blower 27 and the second air blower 57 during an arbitrary time set by the user after the recording device 1 completes the recording on the medium M.

Furthermore, for example, in the above-described embodiment, a configuration in which the recording device 1 includes the first deodorization portion 20 and the second deodorization portion 50 has been described, but this is an example. For example, the recording device 1 may include three or more deodorization portions.

Furthermore, for example, in the above-described embodiment, a configuration in which the first deodorization portion 20 discharges air downward through the duct 29 and the second deodorization portion 50 discharges air downward through the duct 59 has been described. In this configuration, the air discharged from the first deodorization portion 20 and the air discharged from the second deodorization portion 50 are discharged toward the bottom plate 13 inside the housing 10. This is an example, and for example, the first deodorization portion 20 may include the duct 29 connected to the outside of the housing 10, and may be configured to discharge air to the outside of the housing 10 through the duct 29. The same applies to the second deodorization portion 50.

Furthermore, in the above-described embodiment, a locking mechanism for locking the front surface cover 11 and/or the side surface cover 14 may be provided. For example, a first cover locking mechanism for fixing the front surface cover 11 in a state of being closed and locking the front surface cover 11 so as not to be opened may be provided. Furthermore, a second cover locking mechanism for fixing the side surface cover 14 in a state of being closed and locking the side surface cover 14 so as not to be opened may be provided. The first cover locking mechanism and the second cover locking mechanism may be connected to the control unit 101 and configured to be perform locking and unlocking under the control of the control unit 101. In this case, the control unit 101 may perform control of locking the first cover locking mechanism and the second cover locking mechanism while the recording device 1 is performing recording on the medium M and control of unlocking the first cover locking mechanism and the second cover locking mechanism after the recording on the medium M is completed.

Furthermore, in the above-described embodiment, a configuration in which the table 31 on which the medium M is placed does not move in the direction along the X-axis and the direction along the Y-axis and the carriage 89 moves has been described as an example. A target to which the present disclosure is applied is not limited to the configuration of the present embodiment. For example, it is of course possible to apply the present disclosure to the recording device that moves the medium M in at least one of the direction along the X-axis or the direction along the Y-axis when the recording is performed on the medium M.

8. Configuration Described in Embodiment

The following configurations will be described based on the above-described embodiment.

Configuration 1

A recording device including, a medium support portion that supports a medium, a head that ejects a liquid toward the medium, an irradiation unit that emits an ultraviolet ray toward the medium, a carriage on which the head and the irradiation unit are mounted, a moving mechanism that relatively moves the medium supported by the medium support portion and the carriage in a first direction along a first axis and in a second direction along a second axis intersecting the first axis, a first deodorization portion and a second deodorization portion configured to perform deodorization, and a housing that accommodates the medium support portion, the carriage, the first deodorization portion, and the second deodorization portion, in which the first deodorization portion and the second deodorization portion are disposed such that at least a part of the medium support portion overlaps a position between the first deodorization portion and the second deodorization portion in plan view.

In the recording device according to Configuration 1, the first deodorization portion and the second deodorization portion, which deodorize the odor of the liquid ejected by the head, are disposed such that at least a part of the medium support portion overlaps a position between the first deodorization portion and the second deodorization portion. With this configuration, it is possible to efficiently reduce or remove the odor diffused along the medium support portion in accordance with the relative movement of the carriage by the first deodorization portion and the second deodorization portion.

Configuration 2

The recording device according to Configuration 1, in which the first deodorization portion faces the medium support portion in one direction along the first axis, and the second deodorization portion faces the medium support portion in one direction along the second axis.

In the recording device according to Configuration 2, the first deodorization portion and the second deodorization portion are disposed at positions corresponding to the first direction and the second direction in which the carriage relatively moves. Therefore, it is possible to more efficiently deodorize the odor diffused in accordance with the relative movement of the carriage.

Configuration 3

The recording device according to Configuration 1, in which the moving mechanism is configured to move the carriage in the first direction, and a movement range of the carriage in the first direction includes a recording range in which the medium support portion and the head face each other and a retraction range in which the medium support portion and the head do not face each other, and at least a part of the first deodorization portion is positioned in the retraction range in the movement range of the carriage in the first direction.

In the recording device according to Configuration 3, it is possible to more efficiently deodorize the odor by disposing the first deodorization portion in the movement range of the carriage.

Configuration 4

The recording device according to Configuration 1, in which the housing has an opening through which the medium is placeable at and removable from the medium support portion and includes a cover that closes the opening, and the second deodorization portion is disposed on a side opposite to the cover across the medium support portion.

In the recording device according to Configuration 4, it is possible to prevent the odor from leaking from the opening when the cover is opened in order to place and remove the medium.

Configuration 5

The recording device according to Configuration 3, in which a first intake port through which the first deodorization portion takes in air is provided on a surface of the first deodorization portion facing the medium support portion, and a second intake port through which the second deodorization portion takes in air is provided on a surface of the second deodorization portion facing the medium support portion.

In the recording device according to Configuration 5, since the first deodorization portion and the second deodorization portion take in air in a direction facing the medium support portion, it is possible to more efficiently deodorize the odor emitted by the liquid which is ejected from the head toward the medium support portion.

Configuration 6

The recording device according to Configuration 5, in which at least one of the first intake port or the second intake port is open at a position that does not overlap the medium support portion in a third direction along a third axis intersecting the first axis and the second axis.

In the recording device according to Configuration 6, since at least one of the first deodorization portion or the second deodorization portion takes in air from a position which does not overlap the medium support portion, it is possible to efficiently deodorize the odor diffused inside the housing.

Configuration 7

The recording device according to Configuration 6, in which the third direction is a vertical direction, and the second deodorization portion is disposed such that at least a part of the second intake port is located at a position higher than the medium support portion.

In the recording device according to Configuration 7, since at least one of the first deodorization portion or the second deodorization portion takes in air at a position higher than the medium support portion, it is possible to more efficiently deodorize the odor emitted by the liquid which is ejected from the head toward the medium support portion.

Configuration 8

The recording device according to Configuration 1, in which the first deodorization portion and the second deodorization portion are disposed at different positions in a third direction along a third axis intersecting the first axis and the second axis.

In the recording device according to Configuration 8, since the first deodorization portion and the second deodorization portion take in air at different positions, it is efficiently possible to deodorize the odor diffused inside the housing.

Configuration 9

The recording device according to any one of Configurations 1 to 8, in which each of the first deodorization portion and the second deodorization portion includes a deodorization body and an accommodation portion that accommodates the deodorization body, and the deodorization body is removable from the accommodation portion.

In the recording device according to Configuration 9, the deodorization body of the first deodorization portion and the deodorization body of the second deodorization portion can be removed and replaced. Therefore, the odor can be effectively deodorized over a long period of time.

What is claimed is:

1. A recording device comprising:
    a medium support portion that supports a medium;
    a head that ejects a liquid toward the medium;
    an irradiation unit that emits an ultraviolet ray toward the medium;
    a carriage on which the head and the irradiation unit are mounted;
    a moving mechanism that relatively moves the medium supported by the medium support portion and the carriage in a first direction along a first axis and in a second direction along a second axis intersecting the first axis;
    a first deodorization portion and a second deodorization portion configured to perform deodorization; and
    a housing that accommodates the medium support portion, the carriage, the first deodorization portion, and the second deodorization portion, wherein
    the first deodorization portion and the second deodorization portion are disposed such that at least a part of the medium support portion overlaps a position between the first deodorization portion and the second deodorization portion in plan view.

2. The recording device according to claim 1, wherein
    the first deodorization portion faces the medium support portion in one direction along the first axis, and the second deodorization portion faces the medium support portion in one direction along the second axis.

3. The recording device according to claim 1, wherein
    the moving mechanism is configured to move the carriage in the first direction, and
    a movement range of the carriage in the first direction includes a recording range in which the medium support portion and the head face each other and a retraction range in which the medium support portion and the head do not face each other, and at least a part of the first deodorization portion is positioned in the retraction range in the movement range of the carriage in the first direction.

4. The recording device according to claim 3, wherein
    a first intake port through which the first deodorization portion takes in air is provided at a surface of the first deodorization portion facing the medium support portion, and a second intake port through which the second deodorization portion takes in air is provided at a surface of the second deodorization portion facing the medium support portion.

5. The recording device according to claim 4, wherein at least one of the first intake port or the second intake port is open at a position that does not overlap the medium support portion in a third direction along a third axis intersecting the first axis and the second axis.

6. The recording device according to claim 5, wherein the third direction is a vertical direction, and
the second deodorization portion is disposed such that at least a part of the second intake port is located at a position higher than the medium support portion.

7. The recording device according to claim 1, wherein the housing has an opening through which the medium is placeable at and removable from the medium support portion and includes a cover that closes the opening, and
the second deodorization portion is disposed on a side opposite to the cover across the medium support portion.

8. The recording device according to claim 1, wherein the first deodorization portion and the second deodorization portion are disposed at different positions in a third direction along a third axis intersecting the first axis and the second axis.

9. The recording device according to claim 1, wherein each of the first deodorization portion and the second deodorization portion includes a deodorization body and an accommodation portion that accommodates the deodorization body, and the deodorization body is removable from the accommodation portion.

* * * * *